July 19, 1938.  F. A. HAYES  2,124,398
PRECESSION INITIATING AND CONTROLLING MEANS FOR
VARIABLE SPEED TRANSMISSION MECHANISMS
Filed Nov. 30, 1934   2 Sheets-Sheet 1
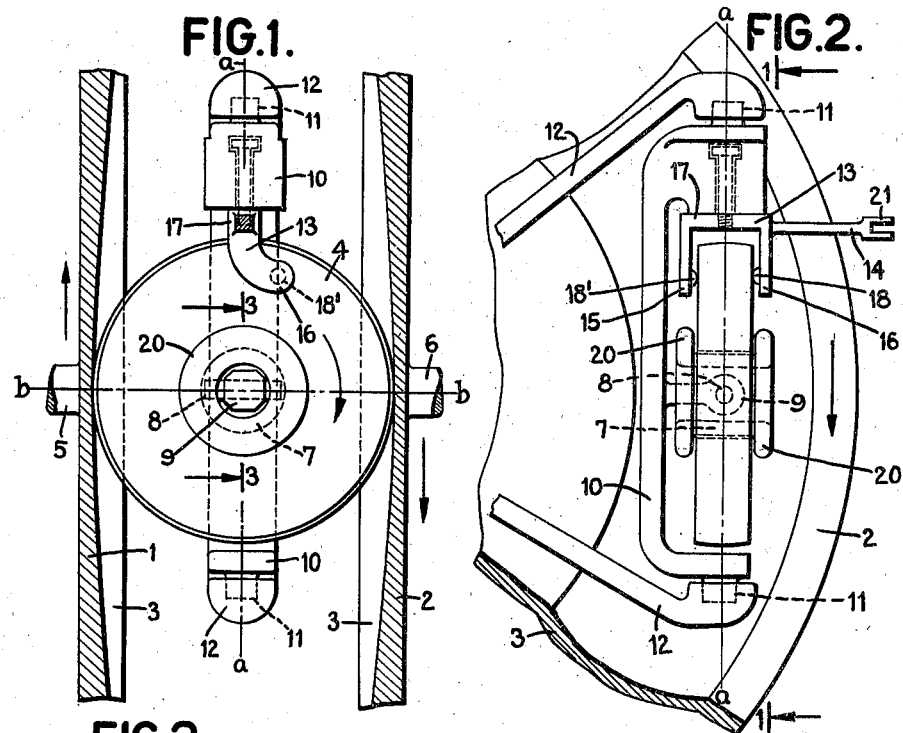
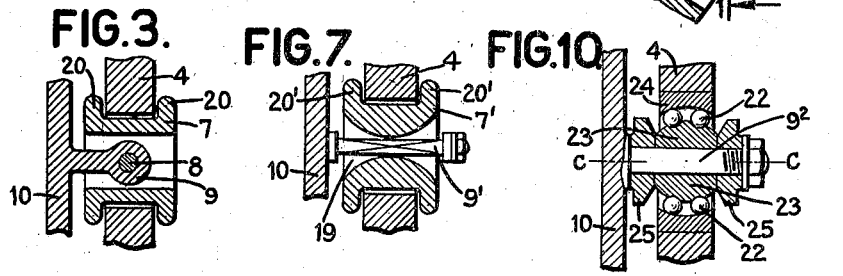
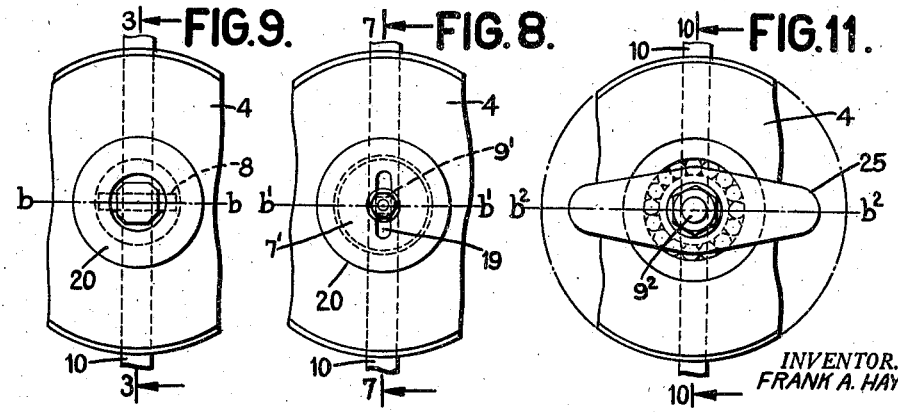
INVENTOR.
FRANK A. HAYES
BY Cooper, Kerr & Dunham
ATTORNEYS.

July 19, 1938.   F. A. HAYES   2,124,398
PRECESSION INITIATING AND CONTROLLING MEANS FOR
VARIABLE SPEED TRANSMISSION MECHANISMS
Filed Nov. 30, 1934    2 Sheets-Sheet 2
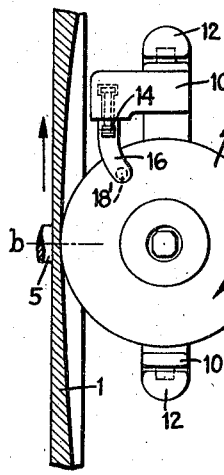
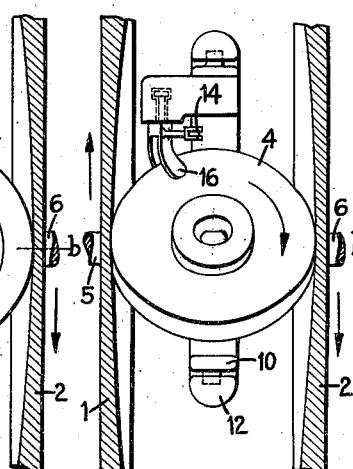
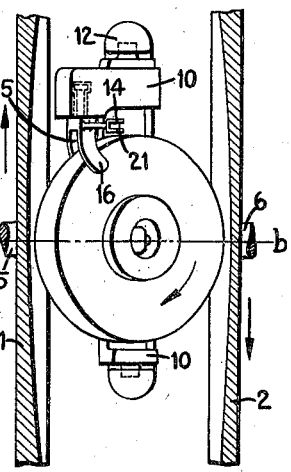
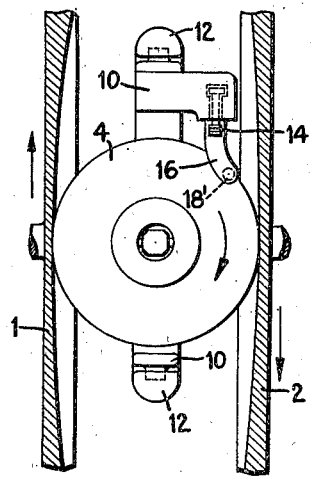
INVENTOR.
FRANK A. HAYES
BY Cooper, Kerr & Dunham
ATTORNEYS.

Patented July 19, 1938

2,124,398

UNITED STATES PATENT OFFICE 2,124,398

PRECESSION INITIATING AND CONTROLLING MEANS FOR VARIABLE SPEED TRANSMISSION MECHANISMS

Frank Anderson Hayes, Middletown, N. J.

Application November 30, 1934, Serial No. 755,315
In Great Britain December 1, 1933

6 Claims. (Cl. 74—200)

This invention relates to variable speed power transmission mechanism or gearing of the torus disc type, comprising a driving disc, a coaxial driven disc, and rollers interposed between said discs and having rolling contact with torus tracks thereon. In such mechanisms the rollers are journalled in carriers in such a manner that each roller is free to rotate about its own axis, and to precess about its axis of precession, precession of the roller being initiated (in some types of construction) by tilting the roller about its contact axis. For the sake of clearness certain expressions used above and hereinafter will now be defined:—

"Axis of rotation of the roller" means that axis about which the roller rotates in rolling on the discs.

"Contact axis" or "axis of tilt" of the roller means that axis joining the points of contact of the roller with the discs; "tilting" of the roller means, therefore, movement thereof about this axis.

"Axis of precession of the roller" or "carrier axis" means that axis about which the roller can rock together with its carrier, to allow the roller to take up a position corresponding to a changed gear or speed ratio between the discs.

It has previously been proposed to have the journal or bearing, about which the roller rotates, "hingedly" connected to the carrier or frame supporting it in such a manner that initial movement of the carrier about the precession axis accomplishes the desired tilt of the roller about its contact axis. The "hinge" or pivotal connection above referred to may be an actual pin or axle or it may be a virtual axis provided by formations on the carrier itself or by members rigidly attached thereto, the effect in either case being to control the relative movements of the carrier and roller, whereas according to the present invention the carrier or frame has a roller tilting member in the form of a guide or fork journalled thereon in such a manner that swivelling movement imparted to said member with respect to the carrier tilts the roller and thus controls precession.

It will be understood that in all constructions in which tilting of the roller is employed to initiate precession there are only two axes in addition to its axis of rotation about which the roller can move without slipping, these two axes being first, its contact axis, and second, its axis of precession. To initiate precession in accordance with the present invention, therefore, it is only necessary to apply pressure to the roller at any point outside its contact axis so as to cause it to tilt about that axis; the roller must, of course, be so mounted that it is free to tilt relatively to the carrier, and to precess with it. Also, the guide or fork by which tilting of the roller is effected must move in such a direction, relative to the direction of rotation of the roller, that the consequent precession causes the carrier to follow and/or catch up with the movement of the guide or fork, and not to "block" or foul the guide.

In order that the present invention may be readily understood, one embodiment thereof will now be described, by way of example, with reference to the accompanying diagrammatic drawings, in which:—

Figure 1 is a sectional view taken on line 1—1 of Figure 2, showing the general arrangement of the roller and its relation to the torus discs.

Figure 2 is a view from the left of Figure 1 but with disc 1 omitted.

Figure 3 is a sectional view taken on line 3—3 of Figures 1 and 9, showing the manner of mounting of the roller upon its hinge or pivotal support.

Figures 4, 5 and 6 are views corresponding to Figure 1 and showing the manner in which the roller is tilted and its consequent precession.

Figure 7 is a sectional view (corresponding to Figure 3) taken on line 7—7 of Figure 8, and Figure 8 is a side elevation of an alternative manner of pivotally mounting the roller.

Figure 9 is a detail view similar to Figure 1 but omitting certain parts shown in the latter.

Figure 10 is a sectional view (corresponding to Figure 3) taken on line 10—11 of Figure 11, and Figure 11 is a side elevation of a further alternative manner of mounting of the roller.

Figure 12 is a view corresponding to Figure 4 showing an alternative positioning of pressure-applying means for the roller.

Referring to the drawings, 1 and 2 are, respectively, two coaxial discs formed with annular grooves 3 in their opposing faces. Working between the discs and in said grooves 3, are rollers, of which only one, designated 4, is shown, the others being identical therewith and situated at suitable intervals apart in the track formed by grooves 3. Disc 1 is connected with a shaft 5 by means of which rotary motion may be imparted to it from an external source, and this motion is transferred to the other disc 2 and the shaft 6 by the frictional engagement of the rollers which, while free to rotate, have no planetary movement about the axis of shafts 5, 6. As is well known, variation of speed ratio between the two discs 1, 2 is obtained by precession of the rollers in the grooves that is, an automatic shifting to a new gear position of the rollers by a rocking of each roller about its axis of precession, indicated by the line a—a in Figures 1 and 2. Roller 4 is journalled so as to be capable of free rotation upon a hollow journal 7 within which is secured a diametrical pin 8. This pin 8 is held between its ends in a member or arm 9 forming part of a gimbaled roller-frame or carrier 10, in such manner that the hollow axle 7 is capable of limited angular movement about the axis of pin 8 which axis is coincident with the contact axis of roller 4, represented by the line b—b in Figure 1. The axis on which the roller rotates is at right angles to the contact axis b—b. The frame or carrier 10 is journaled by means of pins or journals 11 in retaining or supporting members 12 fixed relative to discs 12 and forming part of a structure serving to hold all the rollers in proper position around the grooves 3. The pins or journals 11 lie along the axis of precession of the roller and are mounted in members 12 in such way that the roller together with frame 10 can precess about axis a—a. Frame or carrier 10 is provided with means for controlling automatic precession of roller 4 when the discs are in rotation, said means comprising a fork 13 swivelled in one end of frame 10 and provided with an arm 14 by means of which angular motion or rocking movement may be imparted to the fork about the axis a—a, Fig. 2. The arm 14 may be attached to fork 13 at any point thereon, but is preferably attached thereto at a point adjacent the edge of discs 1, 2 so as to permit of a maximum angular movement of the arm between said discs. The two arms 15, 16 of the fork are curved forwardly from the crown 17 thereof in the direction of rotation of the roller 4, as clearly shown in Figure 1; and adjacent to their lower ends the arms 15, 16 are provided with rollers or balls 18, 18', one or the other of which is caused to bear against the roller when arm 14 is rocked to one side or the other of its normal position, in which latter position each of the balls 18, 18' lies clear of roller 4. The effect of such rocking of arm 14 is to tilt or steer roller 4 about its contact axis b—b, and when the discs 1, 2 are rotating, this at once causes automatic precession of roller 4 in the well-known manner. Such precession has been illustrated in Figures 4, 5 and 6. If with the discs 1, 2 and roller 4 rotating in the respective directions shown in the arrows, arm 14 is moved to the right in Figure 4 into the position shown in Figure 5, roller 4 will be tilted by limb 16 of fork 13 about its contact axis b—b; in this condition the frictional forces acting upon the roller will cause it to precess about axis a—a into the position shown in Figure 6, in which position the speed or gear ratio between disc 1 and disc 2 is lower than that of Figure 4. If arm 14 be rocked in the opposite direction to that illustrated in Figures 4, 5 and 6, the tilting and consequent precession of roller 4 will also be in the opposite direction to that shown, resulting in a raising of the speed ratio between discs 1 and 2.

It is to be observed that whilst in Figure 4 the lateral pressure is shown as being applied to roller 4 in a quadrant containing "angles of retard" (that is, a quadrant extending in the direction of rotation of the roller) from the contact axis b—b, in Figure 12 the pressure is shown as being applied in a quadrant containing "angles of advance" from the contact axis b—b. Contrary to suppositions advanced in connection with previous constructions of torus disc gear, it is quite immaterial in which quadrant of the roller the tilting pressure be applied, provided only that such pressure is not applied at a point on the roller lying along contact axis b—b. It has been stated that the pin 8 lies along the contact axis b—b of the roller. A little reflection will show that this is important in the operation of the device; since roller 4 is held at its points of contact with the discs against lateral movement, the axis passing through these points, that is, contact axis b—b, is the only axis about which the roller can tilt; and since frame or carrier 10 and members 12 in which roller 14 is journalled cannot move about axis b—b, then if roller 40 is turned about that axis, it must have freedom thereabout. Thus pin 8, which is fixed to frame 10, is the only journal capable of providing that freedom and must lie along axis b—b. Pin 8 thus serves as a hinge connecting roller 4 with frame 10 and although this hinge is normally a real and positive member such as 8, it may be only a virtual hinge, that is, it may consist of an axis about which the roller 4 is constrained to pivot by reason solely of forces acting externally of said axis. A construction providing such a virtual hinge is shown in Figures 7 and 8 in which 4 is the roller journalled on a hub or axle member 7'. This axle member is mounted upon a square shaft 9', integral or otherwise rigidly attached to frame 10, in such a way that axle member 7' can pivot thereon about a virtual axis b'—b' (Figure 8). Axle member 7' is formed for this purpose with a slot 19 flared at either end in one plane only, as shown in Figures 7 and 8, but of constant breadth throughout its axial length. Shaft or pin 9' thus provides a journal on which roller 4 can pivot about the contact axis relatively to the carrier in a manner similar to that in which it can pivot about pin 8 in the construction illustrated in Figure 3, although in the construction of Figures 7 and 8 a virtual hinge replaces the real hinge 8 of Figure 3.

A further construction of hinge for connecting the roller with the carrier or frame is shown in Figures 10 and 11. In this construction the roller 4 is journalled on a universal ball bearing comprising balls 22 between an inner race 23 fixed or keyed to shaft or pin $9^2$, which latter is fixed to frame 10, and an outer race 24 fixed to or forming part of the roller 4. Normally such a mounting of the roller upon the shaft $9^2$ would allow three degrees of freedom for the roller, viz., freedom of rotation about axis c—c (Fig. 10), and freedom of limited angular movement about each of the two axes 10—10, $b^2$—$b^2$ (Fig. 11). The freedom of movement about axis 10—10, however, is suppressed by the provision, upon each side of the roller bearing, of shields or guides 25 which extend, as shown in Fig. 11, from the shaft $9^2$ upon which they are fixed, to points along contact axis $b^2$—$b^2$ and near the contact edge of the roller 4. These guides 25 prevent the carrier frame 10 from moving about the precession axis relatively to the roller 4. The roller is thus capable of limited angular movement about the contact axis $b^2$—$b^2$; and shaft $9^2$ and bearing 22, 23, 24, provide a journal on which roller 4 can pivot about its contact axis in a manner similar to that in which it can pivot in the constructions shown in Figures 3 and 9, and in Figures 7 and 8.

It will thus be seen that in accordance with the invention the movement of the roller 4 is strictly related to movement of the guide or fork 13 and is brought about in an easily understood manner by a simple but effective combination comprising essentially three elements, namely the roller carrier, the roller tiltably supported in the carrier, and the roller guiding member controllably journalled on the carrier.

Various modifications may be made in the construction of the mechanism described above, within the scope of the invention. For example, the roller-retaining flanges 20 of hollow axle 7 or the corresponding flanges 20' of hub 7' may be widened so as to extend adjacent to the periphery of roller 4 (care being taken, of course, to allow sufficient clearance between parts when the roller 4 is tilted) or arms 15, 16 may be lengthened, or both, so that the lower ends of the arms may exert their pressure upon the flanges 20 (or 20') instead of upon the roller itself; in this way frictional or rolling contact between the fork and the roller may be eliminated.

Again, it will be understood that the fork member 13 may be so arranged as to rock in a plane parallel to the planes of discs 1, 2, and to cause one of its two limbs (which may in this case be straight) to contact with the roller 4 or flanges 20 or 20'.

Any suitable form of linkage or other means may be utilized to connect the forked end 21 of arm 14 to control means for altering the speed ratio of the transmission mechanism, and if desired such control means may be hydraulic, as is common in the art. It will be understood that in general such control means should serve to adjust simultaneously the ratio positions of all the rollers of the set between discs 1, 2, to insure that no "blocking" of the transmission can occur due to conflicting forces arising within the mechanism.

It will be observed that in Figures 4, 5, 6 and 12 the axis on which the fork has its pivotal movement to tilt the roller on the contact axis is not co-incident with the axis of precession of the roller (axis a—a, Figures 1 and 2) but is outside of the precession axis, being laterally displaced therefrom. For this purpose the fork is pivotally mounted on a laterally extending arm of the carrier, as shown in Figures 4, 5, 6 and 12.

Having now particularly described and ascertained the nature of my said invention and in what manner the same is to be performed, I declare that what I claim is:—

1. In a variable speed transmission mechanism, the combination of torus discs and an interposed friction roller cooperating therewith; a carrier for the roller, mounted for precession on an axis transverse to the axis of rotation of the roller; a bearing for the roller, carried by the carrier and hinged thereto for tilting of the roller on its contact axis only, to cause precession of the roller and carrier; and means pivotally carried by the carrier and pivotally movable relatively thereto on an axis displaced laterally from the axis of precession for tilting the roller on its said contact axis.

2. The combination set forth in claim 1, in which the hinge connection between the roller carrier and the roller bearing comprises a flattened pin rigidly fixed to the carrier and extending therefrom transversely to the contact axis of the roller, and an axle member carrying the roller for rotation thereof and having a slot in which said pin extends, the slot being flared at each end in a single plane to permit tilting of the roller on its contact axis in said single plane only.

3. In a variable speed transmission mechanism, the combination of torus discs and an interposed friction roller cooperating therewith; a carrier for the roller, mounted for precession on an axis transverse to the axis of rotation of the roller; a bearing for the roller, carried by the carrier and hinged thereto for tilting of the roller on its contact axis only, to cause precession of the roller and carrier; and a fork pivotally mounted on the carrier on an axis displaced laterally from the axis of precession, embracing the roller and adapted to engage the same at points laterally displaced with respect to the axis of precession of the roller, whereby pivotal actuation of the fork on its pivotal mounting on the carrier will tilt the roller on its contact axis; and means for actuating the fork.

4. The combination set forth in claim 3, in which the hinge connection between the roller carrier and the roller bearing comprises a flattened pin rigidly fixed to the carrier and extending therefrom transversely to the contact axis of the roller, and an axle member carrying the roller for rotation thereof and having a slot in which said pin extends, the slot being flared at each end in a single plane to permit tilting of the roller on its contact axis in said single plane only.

5. In a variable speed transmission mechanism, the combination of torus disks and an interposed friction roller cooperating therewith for a change of speed ratio by precession on an axis transverse to the axis of rotation of the roller; a bearing carrying the roller for rotation and for tilting on its contact axis only; a supporting pin for the bearing, fixed on the carrier and extending into the bearing; and means pivotally mounted on the carrier on an axis displaced laterally from the axis of precession and movable pivotally relatively thereto for tilting the roller on its said contact axis.

6. In a variable speed transmission mechanism, the combination of torus disks and an interposed friction roller cooperating therewith for change of speed ratio by precession on an axis transverse to the axis of rotation of the roller; a bearing for the roller; a flat-sided pin carried by the carrier and extending into the bearing to support the same for tilting movement on the contact axis of the roller, the bearing having a flat-sided opening receiving the pin and cooperating therewith to prevent tilting on the axis of precession; and means pivotally carried by the carrier and movable pivotally relatively thereto for tilting the roller on its said contact axis.

FRANK ANDERSON HAYES.